(12) United States Patent
Sugiyama et al.

(10) Patent No.: US 8,092,581 B2
(45) Date of Patent: Jan. 10, 2012

(54) GAS SEPARATION MEMBRANE

(75) Inventors: Sho Sugiyama, Tokyo (JP); Takuya Hasegawa, Yokohama (JP); Takahiko Kondo, Tokyo (JP); Hidetoshi Masugi, Tokyo (JP); Takashi Nozaki, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 411 days.

(21) Appl. No.: 12/298,447

(22) PCT Filed: Apr. 25, 2007

(86) PCT No.: PCT/JP2007/058921
§ 371 (c)(1),
(2), (4) Date: Jan. 27, 2009

(87) PCT Pub. No.: WO2007/125944
PCT Pub. Date: Nov. 8, 2007

(65) Prior Publication Data
US 2009/0301307 A1   Dec. 10, 2009

(30) Foreign Application Priority Data

Apr. 28, 2006  (JP) .................. 2006-125704
Nov. 9, 2006  (JP) .................. 2006-304100
Nov. 9, 2006  (JP) .................. 2006-304101
Nov. 9, 2006  (JP) .................. 2006-304102

(51) Int. Cl.
*B01D 53/22* (2006.01)
*B01D 67/00* (2006.01)

(52) U.S. Cl. ................. 96/11; 96/4; 96/9; 96/12; 95/45; 95/54; 55/DIG. 5; 264/48; 264/288.8; 264/290.2

(58) Field of Classification Search .............. 96/4, 9, 96/11, 12, 13; 95/45, 54; 55/523, 524, DIG. 5; 264/41, 48, 288.8, 290.2
See application file for complete search history.

(56) References Cited

U.S. PATENT DOCUMENTS

| | | | | |
|---|---|---|---|---|
| 5,882,518 A | * | 3/1999 | Yagi et al. | 96/4 |
| 6,126,721 A | * | 10/2000 | Nemser et al. | 95/54 |
| 6,540,813 B2 | * | 4/2003 | Nelson et al. | 95/54 |
| 6,723,152 B2 | | 4/2004 | Bikson et al. | |
| 2002/0144595 A1 | * | 10/2002 | Wang et al. | 96/11 |
| 2002/0170430 A1 | | 11/2002 | Baker et al. | |
| 2010/0212504 A1 | * | 8/2010 | Shimizu et al. | 96/12 |

FOREIGN PATENT DOCUMENTS

| | | | |
|---|---|---|---|
| EP | 1163949 A | | 12/2001 |
| JP | 61157325 | | 7/1986 |
| JP | 3080925 | | 4/1991 |
| JP | 10099665 | | 4/1998 |
| JP | 2002502308 | | 1/2002 |
| JP | 2002045664 | | 2/2002 |
| JP | 2002122049 | | 4/2002 |
| JP | 2002-355938 | * | 12/2002 |
| JP | 2002355938 | | 12/2002 |
| JP | 2005296821 | | 10/2005 |
| WO | WO-90-15662 | | 12/1990 |
| WO | WO-9015662 | | 12/1990 |

* cited by examiner

*Primary Examiner* — Jason M Greene
(74) *Attorney, Agent, or Firm* — Morgan, Lewis & Bockius LLP

(57) ABSTRACT

A gas separation membrane has: a polymeric microporous membrane which has a polyolefin as a main component, and which is manufactured by wet phase separation process, and has a porosity of 20 to 80%, an average pore diameter of 1 to 100 nm and a piercing strength at 100° C. of 2 to 50 N; and a gas-separating thin film, which is provided on at least one surface, and/or the interior of the polymeric microporous membrane, and which comprises a fluorine-containing gas-separating resin as a main component, and has an average thickness of 0.01 μm to less than 0.4 μm. The gas separation membrane having an oxygen-nitrogen separation factor not smaller than 1.4.

22 Claims, No Drawings

GAS SEPARATION MEMBRANE

CROSS-REFERENCE TO RELATED APPLICATIONS

The present application is a U.S. National Phase Application of International Application PCT/JP2007/058921, filed Apr. 25, 2007 which is hereby incorporated by reference in its entirety.

TECHNICAL FIELD

The present invention relates to a gas separation membrane delivering excellent gas separation performance.

BACKGROUND ART

Among other characteristics, separation methods employing membranes are used for separating various gases since such methods boast, among other characteristics, higher energy efficiency while using structurally simpler equipment, than other gas separation methods.

The most common embodiment of a gas separation membrane involves forming a thin film of a gas-separating resin on the surface of a porous support membrane. This embodiment is effective for allowing permeation of substantial amounts of gas while imparting certain strength to the membrane. As the porous support membrane there can be used, for instance, a membrane having a structure of an ultrafiltration membrane, as disclosed in Patent document 1.

DISCLOSURE OF THE INVENTION

Problems to be Solved by the Invention

However, the membrane of Patent document 1 is problematic in terms of gas permeation rate, since it uses a polyorganosiloxane resin.

In recent years there have been attempts at using gas separation membranes, having dissimilar oxygen and nitrogen permeabilities, in internal combustion engine systems (Patent document 2). This use of gas separation membranes has attracted attention since these membranes could conceivably help to solve, in a relatively inexpensive way, environmental problems of late associated with exhaust gases and carbon dioxide, by effectively enhancing exhaust gas purification and/or fuel consumption rates in internal combustion engines.

When used for these applications, however, some conventional gas separation membranes have failed to deliver sufficient membrane performance. In an internal combustion engine system, specifically, the membrane is subjected to harsher conditions than in other uses, in that 1) the pressure acting on the membrane is higher, and 2) the temperature in the usage environment of the membrane is higher. Membrane performance could thus not be brought out on account of membrane breakage and/or deformation. For instance, the gas separation membrane described in Patent document 1 is envisaged for use at about room temperature, and hence support membrane strength was insufficient, while degradation of the gas-separating resin was substantial.

Patent document 3 discloses a gas separation membrane in which an amorphous fluororesin covers one face of a porous support membrane comprising a polytetrafluoroethylene resin or a polyolefin resin. Patent document 3, however, does not specifically disclose a method for achieving the maximal capability of the gas-separating resin, and hence it has not been possible to fully bring out the gas permeation performance of the gas-separating resin.

Patent document 4 discloses a single-layer gas separation membrane obtained by forming a film of a perfluorodioxol binary copolymer followed by melt compression molding. The gas separation performance of the resulting separation membrane is high, with an oxygen-nitrogen separation factor no smaller than 1.4. However, the gas performance of the membrane drops when the latter is made thicker with a view to increasing mechanical strength. For this reason, the membrane was difficult to build into practical separation membrane modules.

Patent document 1 Japanese Examined Patent Application Laid-open No. H6-96107
Patent document 2 Japanese Patent Application Laid-open No. 2002-122049
Patent document 3 International Patent Publication Pamphlet 90/15662
Patent document 4 Japanese Patent Application Laid-open No. H10-99665

It is an object of the present invention to provide a gas separation membrane that delivers excellent performance such as gas permeability performance and gas separation ability.

Means for Solving the Problems

As a result of diligent research on the structure of gas separation membranes, the inventors perfected the present invention upon discovering that a gas separation membrane combining a specific porous support membrane and a specific gas-separating thin film delivers excellent gas separation performance such as gas permeability performance and gas separation ability. Specifically, the present invention is:

(1) A gas separation membrane, which comprises a porous support membrane and a gas-separating thin film that comprises a gas-separating resin as a main component, and which has an oxygen permeation rate not smaller than 100 GPU and an oxygen-nitrogen separation factor no smaller than 1.1.

(2) The gas separation membrane according to 1, wherein the porous support membrane is a polymeric microporous membrane having a porosity of 20% to 80%, the gas separation membrane comprises the gas-separating thin film having an average thickness of 0.01 μm to 5 μm at least on one surface, and/or the interior of the polymeric microporous membrane, the oxygen-nitrogen separation factor of the gas-separating resin being not smaller than 1.5.

(3) The gas separation membrane according to 1, wherein the porous support membrane is a polymeric microporous membrane having a porosity of 20% to 80%, the gas-separating resin forms a thin film in an amount from 0.01 g/m$^2$ to 10 g/m$^2$ at least on one surface, and/or the interior of the polymeric microporous membrane, and the oxygen-nitrogen separation factor of the gas-separating resin is not smaller than 1.5.

(4) The gas separation membrane according to 2 or 3, wherein the polymeric microporous membrane is a microporous membrane formed using a polyolefin as a main component.

(5) The gas separation membrane according to 4, wherein the polymeric microporous membrane is a polyolefin microporous membrane manufactured by wet separation process.

(6) The gas separation membrane according to 4 or 5, wherein the polymeric microporous membrane contains one or two types selected from among ultrahigh molecular weight polyethylene having a viscosity average molecular weight of 300,000 to 4,000,000 and polypropylene having a viscosity average molecular weight of 100,000 to 3,000,000.

(7) The gas separation membrane according to any one of 2 to 6, wherein the polymeric microporous membrane is a microporous membrane comprising microfibrils having a network structure.

(8) The gas separation membrane according to any one of 2 to 7, wherein the polymeric microporous membrane has a thickness of 5 μm to 200 μm.

(9) The gas separation membrane according to any one of 2 to 8, wherein the polymeric microporous membrane has an average pore diameter of 1 nm to 300 nm by gas-liquid porometry.

(10) The gas separation membrane according to any one of 2 to 9, wherein the average pore diameter of the polymeric microporous membrane is 0.01 to 0.3 μm, and the pore diameter distribution index is 1.1 to 1.5 by a pullulan method.

(11) The gas separation membrane according to any one of 2 to 10, wherein the air permeability of the polymeric microporous membrane is 50 to 1500 seconds.

(12) The gas separation membrane according to any one of 2 to 11, wherein the piercing strength at 100° C. of the polymeric microporous membrane is 1 to 50 N.

(13) The gas separation membrane according to any one of 1 to 12, wherein the thermal shrinkage of the polymeric microporous membrane at 100° C. is not greater than 5% both in the longitudinal and transversal directions.

(14) The gas separation membrane according to any one of 1 to 13, wherein the gas-separating resin is a fluorine-containing gas-separating thin film comprising a fluororesin.

(15) The gas separation membrane according to any one of 1 to 14, wherein the gas-separating resin is a fluororesin having an oxygen-nitrogen separation factor not smaller than 1.5.

(16) The gas separation membrane according to any one of 1 to 15, wherein the gas-separating resin is a copolymer of perfluoro-2,2-dimethyl-1,3-dioxol and tetrafluoroethylene.

(17) The gas separation membrane according to any one of 1 to 16, wherein the thickness of the gas-separating thin film ranges from 0.01 μm to less than 1 μm.

(18) The gas separation membrane according to any one of 1 to 17, wherein the gas-separating resin forms a thin film in an amount of 0.01 $g/m^2$ to 10 g/m.

(19) The gas separation membrane according to any one of 1 to 18, wherein the thermal shrinkage at 100° C. of the gas separation membrane is not greater than 5% both in the longitudinal and transversal directions.

(20) The gas separation membrane according to any one of 1 to 19, wherein the piercing strength of the gas separation membrane at 100° C. is 1 to 50 N.

(21) The gas separation membrane according to 1 to 20, wherein the oxygen-nitrogen separation factor of the gas separation membrane is not smaller than 1.5.

(22) A nitrogen enriching membrane using the gas separation membrane according to any of 1 to 21.

(23) An oxygen enriching membrane using the gas separation membrane according to any of 1 to 21.

(24) A method for manufacturing the gas separation membrane according to any of 1 to 21, comprising: a film formation step of obtaining a solution by dissolving a polymer resin in a plasticizer at a temperature not lower than the melting point of the polymer resin, obtaining then a gel by cooling the solution at a temperature not higher than the crystallization temperature of the polymer resin, and forming a film using the gel; a stretching step of forming a stretched film by biaxially stretching, by a 4-fold or more stretch ratio, the film obtained in the film formation step; a plasticizer removal step of removing the plasticizer from the stretched film obtained in the stretching step; and a coating and drying step of coating a solution of a gas-separating resin onto the polymeric microporous membrane obtained in the plasticizer removal step and drying the solution of the gas-separating resin.

Effect of the Invention

The present invention allows providing a separation membrane having a high oxygen permeation rate and high oxygen/nitrogen selectivity.

BEST MODE FOR CARRYING OUT THE INVENTION

The present invention is explained in detail next on the basis of preferred embodiments thereof.

The gas separation membrane comprises a porous support membrane and a gas-separating thin film having a gas-separating resin as a main component. Preferably, the gas-separating thin film is provided on a surface and/or the interior of the porous support membrane. In the present description, the term "main component" denotes a constituent component content of 60 wt % or more, preferably 70 wt % or more, more preferably of 80 wt % or more, and most preferably of 90 wt % or more.

Porous Support Membrane

The porous support membrane is a support comprising a membrane of arbitrary shape and material having small pores running through the membrane and connecting the front and reverse face thereof. For instance, the porous support membrane may be a hollow-fiber porous support membrane, a film-like porous support membrane, a nonwoven support membrane or the like, preferably a film-like porous support membrane. A polymeric microporous membrane (hereinafter, simply microporous membrane) is preferred, since such a membrane is pliable, lightweight and can exhibit a larger surface area. Examples of membrane materials include, for instance, acetate, polytetrafluoroethylene, glass fibers, polyolefins, polyethersulfones, cellulose and the like.

The component of the microporous membrane is not particularly limited, provided that the membrane affords the above-described structure and properties. In terms of workability during application of the gas-separating resin solution, however, the microporous membrane used comprises preferably, as a main component, a polyolefin such as polyethylene, polypropylene or the like, more preferably polyethylene.

The polyethylene used may be, for instance, low-density polyethylene, medium-density polyethylene, high-density polyethylene or the like. The polyethylene may comprise only one of the foregoing or a combination of two or more thereof. The polyethylene used may be not only a homopolymer, but also, for instance, a copolymer of ethylene with an α-olefin such as propylene, butene, pentene, hexane, octene or the like, or a graft polymer. The polyethylene may also be a mixture of the foregoing. The molecular weight of the above polyolefin is preferably no smaller than 100,000.

Ultrahigh molecular weight polyethylene may also be added to the above polyethylene component, with a view to imparting heat resistance. Imparting heat resistance and strength has the effect of enhancing dimensional and shape stability in the gas separation membrane, even when the latter is used in high-temperature environments. Ultrahigh molecular weight polyethylene denotes polyethylene having a viscosity average molecular weight no smaller than 300,000. The ultrahigh molecular weight polyethylene may be not only a polyethylene homopolymer, but also a copolymer (linear copolymer polyethylene) comprising no more than 4 mol % of α-olefin units such as propylene, butene, pentene, hexane, octene or the like per ethylene unit.

From the viewpoint of ease of processing, the viscosity average molecular weight of the ultrahigh molecular weight polyethylene is preferably no greater than 4,000,000, ranging more preferably from 500,000 to 9,500,000. A blend of various types of ultrahigh molecular weight polyethylene selected from among the above may also be used. Preferably, there are mixed two or three types of polyethylene having a viscosity average molecular weight from 1,500,000 to less than 5,000,000, from 500,000 to less than 1,500,000, and from 300,000 to less than 500,000, which increases the compatibility between the polyethylenes being mixed, and allows fully bringing out characteristics such as heat resistance. The average molecular weight can be adjusted, for instance, by multistage polymerization or resin blending. Preferably, such a blend is a blend of an ultrahigh molecular weight polyethylene having a weight-average molecular weight no smaller than 1,000,000, and of a high-density polyethylene having a weight-average molecular weight no greater than 500,000.

From the viewpoint of ease of processing, the content of the ultrahigh molecular weight polyethylene ranges preferably from 5 to 100 wt %, more preferably from 10 to 50 wt %, and yet more preferably from 10 to 40 wt % relative to the total weight of resin comprised in the microporous membrane.

Polypropylene may also be added, as the case may require, when the gas separation membrane must have strength and/or heat resistance. Examples of polypropylene that may be used include, for instance, isotactic polypropylene, atactic polypropylene, propylene-ethylene copolymers, 1-butene-propylene copolymers or the like. A preferred example is polypropylene having an isotactic index not lower than 90%. The viscosity average molecular weight of the polypropylene ranges preferably from 100,000 to 3,000,000, more preferably from 150,000 to 2,000,000, and in particular, from 200,000 to 1,000,000.

When polypropylene is added, the content ratio thereof may range from 3 to 50 wt %, but ranges more preferably from 5 to 40 wt %, and yet more preferably from 5 to 30 wt % relative to the total weight of resin comprised in the microporous membrane.

Molecular weight denotes herein molecular weight determined by gel permeation chromatography.

Other components such as inorganic fillers and antioxidants may also be added to the above resin component.

Examples of inorganic fillers include, for instance, silica, mica and talc, singly or in mixtures thereof. The content of inorganic filler ranges preferably from 5 to 80 wt %, more preferably from 10 to 60 wt %, and yet more preferably from 20 to 50 wt % relative to the total weight of the microporous membrane. When mechanical strength is particularly required, the used amount of inorganic filler is preferably smaller than 0.1 wt %, more preferably smaller than 0.05 wt %. When the inorganic filler content lies within the above ranges, the strength of the microporous membrane can be preserved, without any small cracks forming in the membrane, even when the latter is used over long periods of time.

A polymeric microporous membrane formed by microfibrils having a network structure is especially preferred, on account of the small pore diameter afforded thereby. A microporous membrane comprising microfibrils having a network structure boasts a small pore diameter and a narrow pore diameter distribution. The gas-separating thin film is formed more easily as a result, and hence the membrane can be made thinner.

Herein, microfibrils having a network structure refer to a cord-like or fiber-like microscopic continuous structure, observable in the microporous membrane, the structure being highly oriented through stretching. The surface structure of the microporous membrane comprises preferably a network structure in which the microfibrils are uniformly dispersed. Such a uniform dispersion yields a three-dimensional network structure in which the microfibrils having the above network structure do not come substantially into close contact with one another. Instead, the microfibrils intersect each other, are connected to one another, or are branched, in such a manner that voids are formed between the microfibrils. The polymeric microporous membrane has, as a result, a surface structure that comprises small voids (hereinafter, microfibril voids) that are delimited by the microfibrils.

In a microporous membrane having a microfibril structure, the microfibril voids become the pores of the microporous membrane. Herein, the gaps of these voids can be defined as the pore diameter of the microporous membrane. The shape of the voids may adopt various structures, such as a circular shape, an oval shape, a polygonal shape or an indefinite shape. In terms of achieving good permeability and uniform thickness in the gas-separating resin, the size of the voids is preferably uniform. The thickness of the microfibrils ranges preferably from 20 nm to 200 nm over 80% or more of the entire fibril. The shape of the fibrils can be determined by scanning electron microscopy (SEM) observation.

Examples of microporous membranes having the above structure include, for instance, a polyolefin microporous membrane manufactured by a wet phase separation process, or a polyolefin microporous membrane manufactured by a dry process. More preferred herein is a polyolefin microporous membrane manufactured by a wet phase separation process, which is excellent in productivity and which allows obtaining easily a network structure where the above microfibrils are uniformly dispersed.

The thickness of the microporous membrane ranges preferably from 5 μm to 200 μm, since a good balance between mechanical strength and permeability is struck within that range. The lower limit of the thickness is preferably no smaller than 10 μm, more preferably no smaller than 15 μm. The upper limit of the thickness is preferably no greater than 200 μm, more preferably no greater than 100 μm, and most preferably no greater than 80 μm.

The porosity of the microporous membrane ranges preferably from 20% to 80%, since permeability and mechanical strength can be sufficiently ensured within that range. Preferably, the lower limit of the porosity is no smaller than 30%, more preferably no smaller than 40%. The upper limit of the porosity is preferably no greater than 70%. Porosity can be determined in accordance with the methods set forth in the below-described examples.

The air permeability of the microporous membrane ranges preferably from 50 seconds to 1500 seconds, since a higher permeability can be maintained within that range, without membrane defects. The lower limit of the air permeability is preferably no smaller than 70 seconds, more preferably no smaller than 100 seconds. The upper limit of the air permeability is preferably no greater than 1000 seconds, more preferably no greater than 800 seconds. Air permeability can be measured using a Gurley air permeability meter in accordance with JIS P-8117.

The average pore diameter of the microporous membrane ranges preferably from 1 to 10,000 nm, as measured by gas-liquid porometry, since within that range sufficient permeability and mechanical strength can be easily ensured, and the separation factor can take on a value within an appropriate range. The lower limit of the pore diameter is more preferably no smaller than 5 nm, and yet more preferably no smaller than 10 nm. The upper limit of the pore diameter is more preferably no greater than 5000 nm, still more preferably no greater than 1000 nm, even more preferably no greater than 500 nm, still even more preferably no greater than 300 nm, yet even more preferably no greater than 200 mm, and most preferably no greater than 100 nm.

The porosity, air permeability and pore diameter distribution can be adjusted so as to lie within the above ranges by controlling the manufacturing conditions of the membrane.

The pore diameter distribution index $DI_P$ ($DI_P=D_X/D_A$) according to the pullulan method is the ratio between maximum pore diameter $D_X$ and average pore diameter $D_A$ as measured in accordance with the pullulan method in the below-described examples. The pore diameter distribution index $DI_P$ is preferably 1.1 to 2.4, and more preferably 1.1 to 1.5, in which case the gas separation factor becomes higher. More preferably, the diameter distribution index $DI_P$ is 1.1 to 1.4. Although the exact reasons are not fully understood, that is presumably because a pore diameter index close to 1 endows the thin film layer that comprises the gas-separating material with a uniform structure that is less likely to break. Japanese Patent No. 3009495 explains in more detail a method for measuring the average pore diameter of a microporous membrane as well as the pullulan method.

The permeability performance and separation performance of the gas separation membrane can be set to lie within more satisfactory ranges by causing thus the average pore diameter and the particle size distribution index of the microporous membrane to lie within appropriate ranges.

Piercing strength can be an indicator of the mechanical strength of the microporous membrane. The piercing strength of the gas separation membrane at room temperature ranges preferably from 2 N to 50 N. A piercing strength within the above range allows achieving sufficient strength even in usage environments where high pressure is applied to the membrane. This makes modularization easier. More preferably, the piercing strength is no smaller than 3 N, and yet more preferably no smaller than 4 N. More preferably, the piercing strength is no greater than 30 N, and yet more preferably no greater than 20 N.

The piercing strength of the microporous membrane at 100° C. ranges preferably from 1 N to 50 N, and more preferably from 2 N to 50 N. A piercing strength lying within the above ranges facilitates modularization and allows maintaining sufficient strength even in a usage environment at high temperatures. More preferably, the piercing strength at 100° C. ranges from 3 N to 30 N, and yet more preferably from 4 to 20N.

The composition, molecular weight and so forth of the resin comprised in the microporous membrane may be adjusted in order to adjust the piercing strength of the microporous membrane, at room temperature and at 100° C., so as to lie within the above ranges.

The thermal shrinkage of the microporous membrane in the longitudinal (MD) direction and the transversal (TD) direction ranges preferably from 0% to 5% at 100° C., and more preferably from 0% to 20% at 120° C. Within the above ranges, problems such as pore closing, separation performance impairment and the like become less likely to occur, during modularization. Pore closing is also unlikelier to occur, even if the modules are used under high temperature. Yet more preferably, the thermal shrinkage ranges from 0% to 40% at 135° C. To obtain a microporous membrane having such a thermal shrinkage, the latter can be adjusted by controlling membrane formation conditions, such as stretching ratio, thermal treatment temperature and so forth during manufacture of the microporous membrane. Thermal shrinkage is measured in accordance with the method in the below-described examples.

The above-described microporous membrane may also be a laminate comprising a plurality of microporous membranes of any of the above-described components.

Gas-Separating Resin

The gas-separating thin film comprises a gas-separating resin as a main component. The gas-separating resin is a resin having the characteristic of preferentially letting through a specific gas from a mixed gas. Examples of the gas-separating resin that can be used are not particularly limited, provided that the resin has gas separating capability. Such examples include, for instance, fluororesins, silicone resins, polyimide resins, polyester resins, polyamide resins, polyether resins, polyacrylic resins and the like. Preferred among the above resins are fluororesins, which exhibit a preferred gas permeability range, and more preferably, perfluoro amorphous polymers. A preferred example among the latter is a perfluoro-2,2-dimethyl-1,3-dioxol copolymer, in terms of enhancing gas permeation rate, and more preferably, a copolymer of perfluoro-2,2-dimethyl-1,3-dioxol and tetrafluoroethylene. Preferred herein is a copolymer having a mol % of dioxol ranging from 40% to 95%, more preferably from 50% to 90%, and yet more preferably from 64% to 88%.

The gas permeation performance of the gas-separating resin can be expressed by the permeation rate (permeation flux), the permeation coefficient and the separation factor $\alpha$. The permeation rate is the amount of gas that permeates per unit time, unit surface area and unit partial pressure difference, and is measured in GPU (gas permeation units)=$10^{-6}$ $cm^3$(STP)/$cm^2$·sec·cmHg. The permeation coefficient denotes the permeation rate per unit thickness of the membrane, and is measured in barrer units ($10^{-10}$ $cm^3$(STP)cm/$cm^2$·seccmHg). The permeation rate is a characteristic of the membrane while the permeation coefficient is a characteristic of the material. It should be noted that, no matter how good the permeation coefficient of the resin may be, the latter may fail to elicit adequate gas separation unless the resin is also amenable to be made into a sufficiently thin membrane as required. Whether or not the resin is suitable for being made into a thin membrane depends also on the combination of the gas-separating resin, the gas-separating resin solution and the porous support. That is, the foregoing are selected on the basis of a suitable combination thereof. A particularly preferred combination that allows a gas-separating resin to be made into a thin film is, for instance, a fluororesin as the gas-separating resin, a fluorine-containing solvent as the solvent of the fluororesin, and a polyolefin microporous membrane as the microporous membrane.

The separation factor $\alpha$ is the ratio between the permeation coefficients, or permeation rates, of any two or more gases.

The permeation coefficient and the separation factor of the gas-separating resin may be appropriately selected in accordance with the intended use. In gas purification, for instance, the gas-separating resin has preferably the following oxygen permeation characteristics. The oxygen permeation coefficient of the gas-separating resin is preferably no smaller than 100 barrer, more preferably no smaller than 200 barrer yet more preferably no smaller than 500 barter, still yet more preferably no smaller than 1000 barrer, even still yet more preferably no smaller than 1500 barrer, particularly no smaller than 2000 barrer, and most preferably no smaller than 2500 barrer. In the light of the gas permeation coefficients of ordinarily obtained gas-separating resins, the oxygen permeation coefficient of the gas-separating resin is no greater than 100,000 barrer.

When the gas-separating resin of the present invention is used for separating oxygen and nitrogen, the separation factor $\alpha$ ($=RO_2/RN_2$) of oxygen and nitrogen by the gas-separating resin is preferably no smaller than 1.1, since such a separation factor enhances separation efficiency. In terms of workable module size, the separation factor $\alpha$ is more preferably no smaller than 1.4, still more preferably no smaller than 1.5, still yet more preferably no smaller than 1.8, even more preferably, no smaller than 2.0, still even more preferably no smaller than 2.2, yet even more preferably no smaller than 2.4, and most preferably no smaller than 2.6. In the light of the gas permeation coefficients of ordinarily obtained gas-separating resins, the upper limit of the separation factor $\alpha$ is preferably no greater than 16, and more preferably no greater than 10.

The permeation coefficient and the separation factor measure the permeation performance of the material itself, regardless of the thickness and so forth of the gas-separating resin. Accordingly, the permeation coefficient and the separation factor must be measured using a defect-free membrane of known thickness. To this end, therefore, there is firstly prepared a smooth self-supporting membrane, containing no bubbles, and comprising only the material itself by casting the material to a thickness of about 20 to 100 μm. The permeation coefficient and the separation factor of the obtained membrane can then be determined by performing measurements on the basis of JIS-Z-1707.

Gas-Separating Thin Film

The average thickness of the gas-separating thin film can be measured, for instance, on the basis of pictures observed using an electro scanning microscope (SEM). Alternatively, the average thickness of the gas-separating thin film can be measured by applying the gas-separating resin onto the surface of a smooth support membrane, and by calculating then the average thickness on the basis of the applied amount and the specific gravity of the gas-separating resin, assuming that the latter forms a uniform film on the support membrane.

From the viewpoint of permeability, the average thickness of the gas-separating thin film is preferably no greater than 5 μm. In terms of achieving a good gas permeation rate, the average thickness is more preferably no greater than 2 μm, yet more preferably smaller than 1 μm, and most preferably no greater than 0.4 μm. From the viewpoint of durability, the average thickness is preferably no smaller than 0.01 μm, more preferably no smaller than 0.03 μm.

From the viewpoint of durability, moreover, the thickness of the gas-separating thin film is preferably no smaller than the average pore diameter of the microporous membrane, more preferably no smaller than twice, and in particular no smaller than thrice the average pore diameter of the microporous membrane. In terms of permeability, meanwhile, the thickness is preferably no greater than 100 times, more preferably no greater than 80 times, and in particular no greater than 50 times the average pore diameter of the microporous membrane.

The abundance of gas resin on the microporous membrane, namely the coating amount, is preferably no greater than 10 g/m$^2$, since the gas permeation rate lies thereby within a good range. More preferably, the abundance of gas-separating resin is no greater than 4 g/m$^2$ and yet more preferably no greater than 2 g/m$^2$. In terms of durability of the coating amount, meanwhile, the abundance of gas-separating resin is preferably no smaller than 0.01 g/m$^2$, and more preferably 0.06 g/m$^2$.

Gas Separation Membrane

The gas separation membrane has a composite structure comprising a porous support membrane and a gas-separating thin film, having a gas-separating resin as a main component, provided on the surface and/or the interior of the porous support membrane.

The feature of having the gas-separating thin film provided on the surface and/or the interior of the porous support membrane refers to a structure in which a thin film of the gas-separating resin is formed on at least one of the surfaces of the porous support membrane, or a structure in which a thin film of the gas-separating resin is formed in the microfibril voids in the interior of the porous support membrane, so that the microporous membrane and the gas-separating resin thin film are in close contact with each other. Preferably, the gas-separating thin film is present across the entire surface of the porous support membrane or throughout the interior of the porous support membrane.

In terms of balance between durability and processability, the average thickness of the gas separation membrane ranges preferably from 5 μm to 200 μm more preferably from 10 μm to 150 μm, and yet more preferably from 15 μm to 100 μm.

From the viewpoint of workable module size, the oxygen permeation rate of the gas separation membrane is preferably no smaller than 100 GPU, more preferably no smaller than 200 GPU, yet more preferably, no smaller than 500 GPU, and in particular no smaller than 700 GPU. In consideration of material availability, the upper limit of the oxygen permeation rate is no greater than 100,000 GPU. In practical terms, the upper limit is no greater than 10,000 GPU.

In terms of enhancing separation efficiency, the separation factor $\alpha$ ($=RO2/RN2$) of oxygen and nitrogen of the gas separation membrane is preferably no smaller than 1.1, more preferably no smaller than 1.4, yet more preferably no smaller than 1.5, even yet more preferably no smaller than 1.8 and even still yet more preferably no smaller than 2.0. In terms of practicability, the upper limit of the separation factor is preferably no greater than 16, more preferably no greater than 10.

Preferably, moreover, the oxygen permeation rate and the separation factor can be maintained within the above ranges even after a thermal treatment at 80° C. Ways of preserving the above ranges include, for instance, using a heat-resistant resin as the resin of the microporous membrane.

The permeation rate, the permeation coefficient and the separation factor can be adjusted by controlling the pore diameter of the microporous membrane, the selection of the gas-separating resin, and the thickness of the gas-separating membrane. A small pore diameter and a narrow pore diameter distribution facilitate making the gas-separating resin into a thin membrane. A thinner film, in turn, affords a greater gas permeation rate.

The measurement of the gas permeation rate, the separation factor, the permeation coefficient, the permeation rate and the heating treatment conditions at 80° C. may be in accordance with the methods set forth in the below-described examples.

The piercing strength can be an indicator of the mechanical strength of the gas separation membrane. The piercing strength of the gas separation membrane at room temperature ranges preferably from 2 N to 50 N. A piercing strength within the above range allows achieving sufficient strength even in usage environments where high pressure is applied to the membrane, and allows easily making the membrane into a module. More preferably, the piercing strength is no smaller than 3 N, yet more preferably no smaller than 4 N. More preferably, the piercing strength is no greater than 30 N, yet more preferably no greater than 20 N.

The piercing strength at 100° C. can be an indicator of the heat resistance of the gas separation membrane. The piercing strength at 100° C. of the gas separation membrane ranges preferably from 1 N to 50 N, more preferably from 2 N to 50 N. A piercing strength lying within the above ranges facilitates modularization and allows maintaining sufficient strength even in a usage environment at high temperature. More preferably, the piercing strength at 100° C. ranges from 3 N to 30 N, and yet more preferably from 4 to 20 N.

The composition, molecular weight and so forth of the resin comprised in the microporous membrane may be adjusted in order to adjust the piercing strength of the gas separation membrane, at room temperature and at 100° C., to lie within the above ranges.

The thermal shrinkage of the gas separation membrane in the longitudinal (MD) direction and the transversal (TD) direction ranges preferably from 0% to 5% at 100° C., and more preferably from 0% to 20% at 120° C. Within the above ranges, problems such as pore closing, separation performance impairment and the like become less likely to occur during modularization. Pore closing is also unlikelier to occur, even if the modules are used under high temperature. Yet more preferably, the thermal shrinkage ranges from 0% to 40% at 135° C. The thermal shrinkage can be adjusted by controlling membrane formation conditions, such as stretching ratio, thermal treatment temperature and so forth during manufacture of the microporous membrane. Thermal shrinkage is measured in accordance with the method in the below-described examples.

Method for Manufacturing a Porous Support Membrane

A microporous membrane obtained by a dry process or a wet process can be used in the above-described porous support membrane. A wet process is particularly preferred, since a microporous membrane obtained thereby has good porosity and a small pore diameter distribution index. The method for manufacturing such a microporous membrane is preferably a combination of a phase separation method and biaxial stretching, as described below, since such a method allows obtaining structures and characteristics such as those described above.

Specifically, a mixture of the components that make up the microporous membrane are dissolved in a plasticizer (solvent) at a temperature not lower than the melting point of the resin components comprised in the microporous membrane. The resulting solution is cooled down to a temperature not higher than the crystallization temperature of the resins comprised in the microporous membrane, to yield a polymer gel. A membrane is then formed using the polymer gel (membrane formation step), and the obtained membrane is biaxially stretched (stretching step). Thereafter, the plasticizer is removed from the membrane (plasticizer removal step). Thus, the microporous membrane manufacturing method comprising a membrane formation step and a plasticizer removal step is referred to as a phase separation method.

A detailed explanation follows next on a method for manufacturing a microporous membrane having polyethylene as a main component. The plasticizer used is an organic compound that can form a homogeneous solution with polyethylene at a temperature not higher than the boiling point of the plasticizer. Specific examples of the plasticizer include, for instance, decalin, xylene, dioctyl phthalate, dibutyl phthalate, stearyl alcohol, oleyl alcohol, decyl alcohol, nonyl alcohol, diphenyl ether, n-decane, n-dodecane and paraffin oil such as liquid paraffin or the like. Preferred among them are paraffin oil, dioctyl phthalate and decalin. The proportion of plasticizer in the polymer gel is not particularly limited but is preferably 20% to 90%, more preferably 50% to 80%. Within the above ranges, a microporous membrane of adequate porosity can be easily formed continuously.

The method for manufacturing the membrane is not particularly limited, and may be, for instance, the method below. Firstly, a resin powder and a plasticizer are fed into an extruder, followed by melt-kneading of both ingredients at a temperature of about 200° C. The kneaded mixture is then cast, out of an ordinary hanger coat die or a T die, onto a cooling roll, to continuously form thereby a sheet several tens of μm to several mm in thickness. The forming method is preferably a method involving cooling and solidifying using a press, or forming using a T-die, more preferably a forming method using a T-die.

The sheet thus obtained is then stretched in at least a uniaxial direction, to obtain an stretched film. The stretching method is not particularly limited and may be a tenter method, a roll method, a rolling method or the like. Particularly preferred among these is simultaneous biaxial stretching using a tenter method. Stretching can be carried out at a stretching temperature ranging from room temperature to the melting point of the polymer gel, preferably from 80 to 140° C., more preferably from 100 to 130° C. The surface-area stretching ratio is preferably 4 to 400-fold, more preferably 8 to 200-fold, and yet more preferably 16 to 100-fold. A sufficiently strong microporous membrane of adequate porosity can be obtained within the above ranges. Moreover, stretching is easy with such stretching ratios, which is advantageous in terms of productivity.

The microporous membrane is obtained by removing the plasticizer from the stretched film. The method for removing the plasticizer is not particularly limited. For instance, when paraffin oil or dioctyl phthalate is used, the plasticizer may be removed by extraction with an organic solvent such as methylene chloride or methyl ethyl ketone. After organic solvent extraction, the membrane is heat-dried at a temperature not higher than the fusion temperature thereof, so that the plasticizer can be sufficiently removed. When a low-boiling point compound such as decalin is used as the plasticizer, the latter can be removed simply by heat-drying at a temperature not higher than the fusion temperature of the microporous membrane. In either case, the plasticizer is preferably removed while constraining the membrane by fixing or the like, in order to prevent the deterioration of properties due to membrane contraction.

With a view to improving permeability and/or increasing dimensional stability, the microporous membrane thus obtained may be subjected, as the case may require, to a thermal treatment at a temperature not higher than the fusion temperature of the microporous membrane.

Method for Manufacturing the Gas Separation Membrane

The method for manufacturing the gas separation membrane is not particularly limited. To achieve the goal of the present invention, a preferred method herein involves forming a gas-separating thin film by coating the surface of a microporous membrane with a gas-separating resin solution having a concentration of 0.01 wt % to 50 wt %. More preferably, a thin film can be formed in the microporous membrane by lowering the concentration of gas-separating resin solution to 10 wt % or less. As the solvent for dissolving the gas-separating resin there may be selected a solvent in which the used gas-separating resin dissolves readily and having a boiling point from room temperature to 300° C. When using a fluorine-containing gas-separating resin, for instance, the solvent is preferably a fluorine-containing solvent, while when using a hydrocarbon gas-separating resin, the solvent is preferably a hydrocarbon solvent.

When such low-concentration solutions are used, the gas-separating resin may penetrate into the microporous membrane so that a thin film of uniform thickness may be hard to form of the surface of the microporous membrane. Therefore, it is preferable to adjust, among others, the concentration, surface tension, molecular weight and solution parameters of the gas-separating resin, as well as the viscosity, polarity, surface tension and so forth of the solvent, in accordance with the pore diameter, surface tension and solution parameters of the used microporous membrane. For instance, using a high molecular weight gas-separating resin and using a solvent that interacts strongly with the gas-separating resin is preferable, since this makes it easier to form a thin film on a porous surface. A highly reliable ultra-thin film, little prone to breakage, can be formed on the surface of the microporous membrane by suitably selecting and combining the molecular weight of the gas-separating resin, the type of the solvent, the viscosity of the solution and the coating amount.

A preferred coating method involves, for instance, coating a predetermined amount of a gas-permeable resin solution on one face or both faces of a film-like microporous membrane, followed by drying. Preferred coating methods include, for instance, dip coating, gravure coating, die coating, spray coating and so forth. In dip coating, which is particularly preferred, the film-like microporous membrane is dipped in a bath of a gas-separating resin solution, whereafter the solution amount on the microporous membrane surface is adjusted, using a reverse roll, a kiss roll or the like, in such a manner so as to form a predetermined gas-separating resin thin film.

Preferably, the surface of the microporous membrane is further subjected to a treatment such as electric discharge with a view to increasing adherence between the gas-separating thin film and the porous support membrane.

Effect and Applications of the Gas Separation Membrane

A gas separation membrane having the above characteristics, being a composite of a support membrane and a gas-separating resin, delivers a gas separation performance unknown in conventional gas separation membranes, and can hence be used as a membrane for separating various gases. The membrane is useful, for instance, as a nitrogen enrichment membrane or an oxygen enrichment membrane. Depending on the conditions, there can be obtained also a membrane capable of preserving strength and heat resistance, and of preserving gas separation ability under temperature-resistant conditions. A gas separation membrane delivering thus excellent performance can be used, for instance, as a gas separation membrane for gas purification.

Gas Separation Module

The gas separation membrane, which can be employed in ordinary gas separation modules that use film-like membranes, is not limited to a module shape. The gas separation membrane of the present invention is preferably used formed in a pleated shape.

EXAMPLES

The present invention will be explained in more concrete terms below using examples and the like. The present invention, however, is not limited in any way to or by these examples. The characteristic test methods and treatment methods in the examples and comparative examples are as follows.

(1) Observation Conditions in Scanning Electron Microscopy (SEM)

Scanning electron microscopy (SEM) observation was carried out under the following conditions.

Specimens: the microporous membrane was cut to an adequate size, was fixed to a specimen stage and was coated with about 6 nm of Os, to yield a sample for microscopic inspection.

Apparatus: HITACHI S-4700
Acceleration voltage: 1 kV
MODE: Ultra High Resolution
Detector: Upper (2) Surface Structure of the Microporous Membrane The surface structure of the microporous membrane was determined by scanning electron microscopy (SEM), under the conditions set forth in (1).

(3) Thickness of the Microporous Membrane

Membrane thickness was measured using a dial gauge (PEACOCK No. 25,™, by Ozaki Seisakusho).

(4) Porosity of the Microporous Membrane

Porosity was calculated using the equation below on the basis of the volume and weight of a 10 cm square sample of the microporous membrane. The density of the resin (g/cm$^3$) was measured by density gradient method, in accordance with ASTM-D1505.

$$\text{Porosity}(\%)=(\text{volume}(cm^3)-\text{weight}(g)/\text{polymer composition density})/\text{volume}(cm^3)\times 100$$

(5) Piercing Strength (Room Temperature) of the Microporous Membrane and Gas Separation Membrane A piercing test was conducted using a "KES-G5 Handy Compression Tester"™ by Kato Tech Co., Ltd., with a radius of curvature of the needle tip of 0.5 mm and a piercing speed of 2 mm/sec, to measure the maximum piercing load (N).

(6) Piercing Strength (100° C.) of the Microporous Membrane and Gas Separation Membrane The microporous membrane or the gas separation membrane was sandwiched between two stainless steel washers having an inner diameter of 13 mm and an outer diameter of 25 mm, the whole was fastened with clips at 4 points in the periphery of the washers, and then the assembly was dipped into a silicone oil at 100° C. (KF-96-10CS, by Shin-Etsu Chemical Co. Ltd.). The piercing strength was measured one minute thereafter in the same way as in (5).

(7) Air Permeability of the Microporous Membrane

Air permeability was determined using a Gurley permeability tester according to JIS P-8117.

(8) Thickness (D (μm)) of the Gas-Separating Resin Thin Membrane on the Gas Separation Membrane The average thickness of the gas separation membrane was calculated, in accordance with the formula below, from the basis weight (coating amount W (kg)) of adhered gas-separating thin film per unit surface area projected area A (m$^2$)) of the microporous membrane, and the known density ($\rho$(kgm$^{-3}$)) of the gas-separating resin.

$$D=[W/(\rho \cdot A)] \cdot 10^6$$

(9) Gas Permeability of the Gas Separation Membrane

The gas separation membrane was cut into a 47-mm diameter disc and was fixed to a stainless steel holder (KS-47F Holder, by Advantec). Oxygen at 99.9% or higher, or nitrogen at 99.9% or higher, were compressed, with a predetermined pressure, from the primary side of the holder. Substitution of 99% or more of the oxygen, or of 99% or more of the nitrogen at the atmosphere on the secondary side was checked using an oxygen concentration meter, after which the amount of permeated gas was measured using a soap film flow meter. The permeation rate (GPU: Gas permeation unit=$10^{-6}$ cm$^3$(STP)/cm$^2$ sec·cmHg) in standard conditions was calculated on the basis of the amount of permeated gas, the gas temperature and atmospheric pressure. The separation factor α was calculated as the ratio between the permeation rates of oxygen and nitrogen.

(10) Average Pore Diameter (μm)

As is known, a fluid inside a capillary flows in Knudsen flow when the mean free path of the fluid is larger, and in Poiseuille flow when the mean free path of the fluid is smaller, than the pore diameter of the capillary.

Thus, the average pore diameter d (μm) was calculated under the conditions below assuming that, in the measurement of the air permeability of the microporous membrane, air flows in Knudsen flow, while in the measurement of water permeability of the microporous membrane, water follows in Poiseuille flow.

Specifically, the average pore diameter d can be determined on the basis of the equation below by plugging the permeation rate constant of air $Rgas(m^3/(m^2 \cdot sec \cdot Pa))$, the permeation rate constant of water $Rliq(m^3/(m^2 \cdot sec \cdot Pa))$, the molecular speed of air $v(m/sec)$, the viscosity of water $\eta$ (Pa·sec), the standard pressure Ps(=101325 Pa), the porosity $\epsilon$ (%) and the membrane thickness L (μm) into the formulas below.

$$d=2v \times (Rliq/Rgas) \times (16\eta/3Ps) \times 10^6$$

Herein, Rgas can be obtained in accordance with the formula below on the basis of the air permeability (sec)

$$Rgas=0.001/(\text{air permeability} \times (6.424 \times 10^{-4}) \times (0.01276 \times 101325))$$

Also, Rliq can be obtained in accordance with the formula below on the basis of the water permeability $(m^3/(m^2 \cdot sec \cdot Pa))$.

$$Rliq = \text{water permeability}/100$$

The water permeability can be determined as follows. The microporous membrane, soaked beforehand in alcohol, is set in a liquid-permeable cell of stainless steel having a diameter of 41 mm. After washing with water the alcohol of the membrane, water is made to pass through the membrane with a differential pressure of about 50000 Pa. The amount of water ($cm^3$) that permeates over 120 sec is taken as the basis for calculating water permeability, which is the amount of water permeated per unit time, unit pressure and unit surface area.

(11) Thermal Shrinkage of the Microporous Membrane (%)

A 10 cm square sample cut out of the microporous membrane longitudinally (machine direction) and transversally (width direction) was placed in a circulating hot air oven heated at a predetermined temperature (100° C., 120° C., 135° C.), with the four corners of the sample unconstrained. After 2 hours of heating, the sample was taken out of the oven and was left to stand for 30 minutes. Thereafter, the longitudinal (machine direction) and transversal (width direction) of the sample were measured to calculate the thermal shrinkage.

(12) Viscosity Average Molecular Weight

A sample was dissolved in decahydronaphthalene to prepare a sample solution. The intrinsic viscosity (η) of the solution was measured using a Cannon-Fenske viscometer (SO 100) in a thermostatic bath for dynamic viscosity measurement (Thomas Kagaku Co., Ltd.) adjusted at 135° C. The viscosity average molecular weight Mv was calculated using the obtained (η) in accordance with Chiang's equation below.

$$[\eta]=6.77 \times 10^{-4} Mv^{0.67}$$

(13) Thermal Treatment of the Gas Separation Membrane

A 10 cm square sample cut out of the microporous membrane longitudinally (machine direction) and transversally (width direction) was placed in a circulating hot air oven heated at 100° C., with the four corners of the sample unconstrained. After 1000 hours of heating, the sample was taken out of the oven and was left to stand for 30 minutes.

(14) Pore Diameter Distribution Index by the Pullulan Method

The measurement was performed in accordance with the procedure disclosed in Japanese Patent No. 3009495. Specifically, Average pore diameter: a 0.05 wt % aqueous solution of pullulan (by Showa Denko K.K.) was circulated at a differential pressure of 380 mmHg using a flat membrane module. The concentration of pullulan in the filtrate was determined by differential refractometry. The pore diameter was calculated then according to the Flory theory on the basis of a pullulan molecular weight value corresponding to a rejection factor of 50%, as calculated on the basis of the formula Pullulan rejection factor={1−(concentration of pullulan in filtrate/concentration of pullulan in stock solution)}×100

The chain-like polymer molecules in solution adopt a yarn ball shape, the diameter d of which can be approximately related to the root mean square end-to-end distance of the molecular chains $<\gamma2>$, as follows $[d/2]^2=<\gamma2>$ ... (1). According to the Flory theory that relates the extent of molecular chains and the viscosity of a polymer solution, the expression $[\eta]M=2.1 \times 1021<\gamma2>3/2$ ... (2) holds irrespective of polymer type, and hence the diameter d of the molecular chains can be calculated using formulas (1) and (2) on the basis of the measured value of intrinsic viscosity [η] and molecular weight M for a rejection coefficient of 50%. This value d was taken as the average pore diameter $D_A$ Of the microporous membrane.

A pore diameter calculated on the basis of the molecular weight value of pullulan for a rejection coefficient of 90% was taken as the largest pore diameter, similarly to the measurement above.

The pore diameter distribution index of the microporous membrane was calculated on the basis of the above results, in accordance with the formula below.

Dip(pore diameter distribution index by the pullulan method)=largest pore diameter $D_x(\mu m)$/average pore diameter $D_A(\mu m)$.

(15) Pore Diameter Distribution Using a Mercury Porosimeter (Mercury Intrusion Method)

A support film of the sample, in an amount of about 0.15 g, was cut to a width of about 25 mm, was folded and was placed in a standard cell and then a measurement was performed with an initial pressure of 20 kpa (3 psia, equivalent to a pore diameter of 60 μm). The measuring instrument used was Shimadzu Autopore 9220 (by Shimadzu). The measurement point was 130 point, set at log equal intervals. The data were arranged with the X-axis representing the logarithm of the pore diameter and the Y-axis representing the log differential pore volume. The calculation expressions are as follows.

V(n) [mL/g]: cumulative pore volume

D(n) [μm]: pore diameter $\Delta V$ [1 mL/g]=V(n)−V(n+1): differential volume dV/dlogD[mL/g]=$\Delta V$/logD(n)−logD(n+1): log differential pore volume Dm [μm]: mode diameter (pore diameter corresponding to maximum of the log differential pore volume curve)

$W_{1/2}$[μm]: half width of the mode diameter peak, such that $W_{1/2}$=Da−Db. The pore diameters Da, Db, which give the value of half the log differential pore volume value, corresponding to the mode diameter, are read from the mode diameter peaks.

DI$_{Hg}$ (pore diameter distribution by mercury porometry)= W$_{1/2}$/Dm

(16) Viscosity Average Molecular Weight

A sample was dissolved in decahydronaphthalene to prepare a sample solution. The intrinsic viscosity (η) of the solution was measured using a Cannon-Fenske viscometer (SO 100) in a thermostatic bath for dynamic viscosity measurement (Thomas Kagaku Co., Ltd.) adjusted at 135° C. The viscosity average molecular weight Mv was calculated using the obtained intrinsic viscosity (η) in accordance with Chiang's equation below.

$$[\eta]=6.77\times10^{-4}Mv^{0.67}$$

(17) Pressure/Thermal Treatment of Gas Separation Membrane

The gas separation membrane measured in (9), fixed to a holder, was pressurized with compressed air at 200 kPa (gauge pressure) from the primary side, and was placed, together with the holder, in a circulating hot air oven heated at 80° C., where it was heated for 1000 hours. Thereafter, the gas separation membrane was taken out of the oven and was left to stand for 30 minutes.

(18) Inorganic Filler Content in the Microporous Membrane

The inorganic filler content was determined using an X-ray fluorescence instrument.

(19) Pressure/Thermal Treatment of the Gas Separation Membrane

The gas separation membrane measured in (10), fixed to a holder, was pressurized with compressed air at 200 kPa (gauge pressure) from the primary side, and was placed, together with the holder, in a circulating hot air oven heated at 80° C., where it was heated for 1000 hours. Thereafter, the gas separation membrane was taken out of the oven and was left to stand for 30 minutes.

(20) Preparation of a Gas-Separating Resin Solution

A perfluoro amorphous polymer (Teflon® AF 1600, by DuPont, density 1.78 g/cm$^3$) was dissolved, to a concentration of 1.0 wt %, in a perfluoro solvent having a boiling point of 97° C. (Fluorinert FC-77 by 3M).

Reference Examples

The microporous membranes below were prepared as the porous support membrane.

Reference Example 1-1

A mixture was obtained by mixing 100 parts by weight of high-density polyethylene (viscosity average molecular weight 280,000) and 0.3 parts by weight of an antioxidant. The mixture was fed, via a feeder, into a biaxial extruder. Further, 100 parts by weight of liquid paraffin (dynamic viscosity of 75.9 cSt at 37.78° C.) were injected into the extruder, through a side feeder, to carry out melt kneading at 200° C. The obtained polymer gel vas extruded through a T-die fitted at the leading end of the extruder, and was then immediately cooled and solidified over a cast roll cooled at 25° C., to form a 1.9 mm-thick sheet.

The sheet was stretched 7×7 fold in a simultaneous biaxial stretching machine at 120° C. Thereafter, the stretched sheet was dipped in methyl ethyl ketone to extract and remove thereby the liquid paraffin, followed by drying to yield a microporous membrane. The microporous membrane was then thermally fixed at 125° C. The obtained microporous membrane had a thickness of 40 μm, a basis weight of 24 g/m$^2$, a porosity of 40%, an air permeability of 800 seconds, an average pore diameter of 50 nm, and a piercing strength of 9.5 N. This microporous membrane was microporous membrane 1-1. Observation in accordance with the methods in (1) and (2) above revealed that the surface structure of the membrane was a microfibril structure.

Reference Example 1-2

A mixture was obtained by mixing 95 parts by weight of high-density polyethylene (viscosity average molecular weight 280,000), 5 parts by weight of polypropylene (viscosity average molecular weight 250,000) and 0.3 parts by weight of an antioxidant. The mixture was fed, via a feeder, into a biaxial extruder. Further, 100 parts by weight of liquid paraffin (dyn ic viscosity of 75.9 cSt at 37.78° C.) were injected into the extruder, through a side feeder, to carry out melt kneading at 200° C. The obtained polymer gel was extruded through a T-die fitted at the leading end of the extruder, and was then immediately cooled and solidified over a cast roll cooled at 25° C., to form a 1.3 mm-thick sheet.

The sheet was stretched 7×7 fold in a simultaneous biaxial stretching machine at 120° C. Thereafter, the stretched sheet was dipped in methyl ethyl ketone to extract and remove thereby the liquid paraffin, followed by drying to yield a microporous membrane. The microporous membrane was then thermally fixed at 125° C. The obtained microporous membrane had a thickness of 20 μm, a basis weight of 12 g/m$^2$, a porosity of 40%, an air permeability of 300 seconds, an average pore diameter of 70 nm, and a piercing strength of 5.0 N. This microporous membrane was microporous membrane 1-2. Observation in accordance with the methods in (1) and (2) above revealed that the surface structure of the membrane was a microfibril structure.

Reference Example 1-3

A mixture was obtained by mixing 7 parts by weight of ultrahigh molecular weight polyethylene (viscosity average molecular weight 2,000,000), 28 parts by weight of high-density polyethylene (viscosity average molecular weight 280,000) and 0.3 parts by weight of an antioxidant. The mixture was fed, via a feeder, into a biaxial extruder. Further 65 parts by weight, relative to the mixture, of liquid paraffin (dynamic viscosity of 75.9 cSt at 37.78° C.) were injected into the extruder, through a side feeder, to carry out melt kneading at 200° C. The obtained polymer gel was extruded through a T-die fitted at the leading end of the extruder, and was then immediately cooled and solidified over a cast roll cooled at 25° C., to form a 1.2 mm-thick sheet.

The sheet was stretched 7×7 fold in a simultaneous biaxial stretching machine at 120° C., whereafter the stretched sheet was dipped in methyl ethyl ketone to extract and remove thereby the liquid paraffin, followed by drying to yield a microporous membrane The microporous membrane was then thermally fixed at 125° C. The obtained microporous membrane had a thickness of 16 μm, a basis weight of 0.9 g/m$^2$, a porosity of 40%, an air permeability of 300 seconds, an average pore diameter of 50 nm, and a piercing strength of 5.5 N. This microporous membrane was microporous membrane 1-3. Observation in accordance with the methods in (1) and (2) above revealed that the surface structure of the membrane was a microfibril structure.

Reference Example 1-4

A mixture was obtained by mixing 60 parts by weight of high-density polyethylene (viscosity average molecular weight 280,000), 40 parts by weight of silica flour, and 0.3 parts by weight of an antioxidant mixed with the foregoing composition. The mixture was fed, via a feeder, into a biaxial extruder. Further, 100 parts by weight of liquid paraffin (dynamic viscosity of 75.9 cSt at 37.78° C.) were injected into the extruder, through a side feeder, to carry out melt kneading at 200° C. The obtained polymer gel was extruded through a T-die fitted at the leading end of the extruder, and was then immediately cooled and solidified over a cast roll cooled at 25° C., to form a 1 mm-thick sheet.

The sheet was stretched 7×7 fold in a simultaneous biaxial stretching machine at 120° C. Thereafter, the stretched sheet was dipped in methyl ethyl ketone to extract and remove thereby the liquid paraffin followed by drying to yield a microporous membrane. The microporous membrane was then thermally fixed at 140° C. The obtained microporous membrane had a thickness of 16 μm, a basis weight of 10.6 g/m$^2$, a porosity of 41%, an air permeability of 130 seconds, an average pore diameter of 100 nm, and a piercing strength of 4.5 N. This microporous membrane was microporous membrane 1-4. Observation in accordance with the methods in (1) and (2) above revealed that the surface structure of the membrane was a microfibril structure.

Reference Example 1-5

A mixture was obtained by mixing 40 parts by weight of high-density polyethylene (viscosity average molecular weight 280,000) and 0.3 parts by weight of an antioxidant relative to the high-density polyethylene. The mixture was fed, via a feeder, into a biaxial extruder. Further 60 parts by weight, relative to the mixture, of liquid paraffin (dynamic viscosity of 75.9 cSt at 37.78° C.) were injected into the extruder, through a side feeder, to carry out melt kneading at 200° C. in a biaxial kneader. The polymer gel was cooled and solidified in a press, to form a 1 mm-thick sheet. The sheet was fixed by being clamped in a metal frame. The frame was then dipped into methylene chloride, to extract and remove thereby the liquid paraffin. Thereafter, this stock sheet was set in a biaxial extruder, where it was stretched 5×5 fold at 120° C. The sheet was further thermally fixed at 125° C. The obtained microporous membrane had a thickness of 20 μm, a basis weight of 10.0 g/m$^2$, a porosity of 48%, an air permeability of 130 seconds, an average pore diameter of 0.1 μm, and a piercing strength of 2.5 N. This microporous membrane was microporous membrane 1-5. Observation in accordance with the methods in (1) and (2) above revealed that the microporous membrane exhibited not a microfibril structure but a vein-like nonuniform porous structure.

Reference Example 2-1

A mixture was obtained by mixing 100 parts by weight of high-density polyethylene (viscosity average molecular weight 280,000) and 0.3 parts by weight of an antioxidant. The mixture was fed, via a feeder, into a biaxial extruder. Further, 100 parts by weight of liquid paraffin (dynamic viscosity of 75.9 cSt at 37.78° C.) were injected into the extruder, through a side feeder, to carry out melt kneading at 200° C. The obtained polymer gel was extruded through a T-die fitted at the leading end of the extruder, and was then immediately cooled and solidified over a cast roll cooled at 25° C., to form a 1.3 mm-thick sheet.

The sheet was stretched 7×7 fold in a simultaneous biaxial stretching machine at 120° C., whereafter the stretched film was dipped in methyl ethyl ketone to extract and remove thereby the liquid paraffin, followed by drying to yield a microporous membrane. The microporous membrane was then thermally fixed at 130° C. The obtained microporous membrane was microporous membrane 2-1. Observation in accordance with the methods in (1) and (2) above revealed that the surface structure of the membrane was a microfibril structure.

Reference Example 2-2

A mixture was obtained by mixing 95 parts by weight of high-density polyethylene (viscosity average molecular weight 280,000), 5 parts by weight of polypropylene (viscosity average molecular weight 250,000) and 0.3 parts by weight of an antioxidant. The mixture was fed, via a feeder, into a biaxial extruder. Further, 100 parts by weight of liquid paraffin (dynamic viscosity of 75.9 cSt at 37.78° C.) were injected into the extruder, through a side feeder, to carry out melt kneading at 200° C. The obtained polymer gel was extruded through a T-die fitted at the leading end of the extruder, and was then immediately cooled and solidified over a cast roll cooled at 25° C., to form a 1.3 mm-thick sheet.

The sheet was stretched 7×7 fold in a simultaneous biaxial stretching machine at 120° C., whereafter the stretched film was dipped in methyl ethyl ketone to extract and remove thereby the liquid paraffin, followed by drying to yield a microporous membrane. The microporous membrane was then thermally fixed at 135° C. The obtained microporous membrane was microporous membrane 2-2. Observation in accordance with the methods in (1) and (2) above revealed that the surface structure of the membrane was a microfibril structure.

Reference Example 2-3

A mixture was obtained by mixing 30 parts by weight of ultrahigh molecular weight polyethylene (viscosity average molecular weight 1,000,000) and 0.3 parts by weight of an antioxidant. The mixture was fed, via a feeder, into a biaxial extruder. Further 70 parts by weight of liquid paraffin (dynamic viscosity of 75.9 cSt at 37.78° C.) were injected into the extruder, through a side feeder, to carry out melt kneading at 200° C. The obtained polymer gel was extruded through a T-die fitted at the leading end of the extruder, and was then immediately cooled and solidified over a cast roll cooled at 25° C., to form a 0.8 mm-thick sheet.

The sheet was stretched 5×5 fold in a simultaneous biaxial stretching machine at 130° C. Thereafter, the stretched sheet was dipped in methyl ethyl ketone to extract and remove thereby the liquid paraffin, followed by drying to yield a microporous membrane. The microporous membrane was then thermally fixed at 140° C. The obtained microporous membrane was microporous membrane 2-3. Observation in accordance with the methods in (1) and (2) above revealed that the surface structure of the membrane was a microfibril structure.

Reference Example 2-4

A mixture was obtained by mixing 100 parts by weight of high-density polyethylene (viscosity average molecular weight 280,000) and 0.3 parts by weight of an antioxidant. The mixture was fed, via a feeder, into a biaxial extruder. Further, 100 parts by weight of liquid paraffin (dynamic viscosity of 75.9 cSt at 37.78° C.) were injected into the extruder, through a side feeder, to carry out melt kneading at 200° C. The obtained polymer gel was extruded through a T-die fitted at the leading end of the extruder, and was then immediately cooled and solidified over a cast roll cooled at 25° C., to form a 1.3 mm-thick sheet.

The sheet was stretched 7×7 fold in a simultaneous biaxial stretching machine at 120° C., whereafter the stretched sheet was dipped in methyl ethyl ketone to extract and remove thereby the liquid paraffin, followed by drying to yield a microporous membrane. The obtained microporous membrane was microporous membrane 2-4. Observation in accordance with the methods in (1) and (2) above revealed that the surface structure of the membrane was a microfibril structure.

Reference Example 3-1

A mixture was obtained by mixing 70 parts by weight of high-density polyethylene (viscosity average molecular weight 280,000), 30 parts by weight of polypropylene (viscosity average molecular weight 250,000) and 0.3 parts by weight of an antioxidant. The mixture was fed, via a feeder, into a biaxial extruder. Further, 100 parts by weight, relative to the mixture, of liquid paraffin (dynamic viscosity of 75.9 cSt at 37.78° C.) were injected into the extruder, through a side feeder, to carry out melt kneading at 200° C. The obtained polymer gel was extruded through a T-die fitted at the leading end of the extruder, and was then immediately cooled and solidified over a cast roll cooled at 25° C., to form a 1.3 mm-thick sheet.

The sheet was stretched 7×7 fold in a simultaneous biaxial stretching machine at 120° C., whereafter the stretched film was dipped in methyl ethyl ketone to extract and remove thereby the liquid paraffin, followed by drying to yield a microporous membrane. The microporous membrane was then thermally fixed at 125° C. The obtained microporous membrane was microporous membrane 3-1. Observation in accordance with the methods in (1) and (2) above revealed that the surface structure of the membrane was a microfibril structure.

Reference Example 3-2

A microporous membrane was prepared in accordance with the same method as in Reference example 3-1, except that herein the starting resins were 50 parts by weight of high-density polyethylene (viscosity average molecular weight 280,000) and 50 parts by weight of polypropylene (viscosity average molecular weight 250,000). The obtained microporous membrane was microporous membrane 3-2. Observation in accordance with the methods in (1) and (2) above revealed that the surface structure of the membrane was a microfibril structure.

Reference Example 3-3

A mixture was obtained by mixing 40 parts by weight of high-density polyethylene (viscosity average molecular weight 280,000), 0.3 parts by weight of an antioxidant, and 60 parts by weight of liquid paraffin (dynamic viscosity of 75.9 cSt at 37.78° C.). The mixture was fed, via a feeder, into a biaxial extruder, to carry out melt kneading at 200° C. The polymer gel was cooled and solidified in a press, to form a 1 mm-thick sheet. The sheet was fixed by being clamped in a metal frame that was then dipped into methylene chloride, to extract and remove thereby the liquid paraffin. Thereafter, this stock sheet was set in a biaxial extruder, where it was stretched 5×5 fold at 115° C. and furthermore thermally fixed at 125° C. The obtained microporous membrane was microporous membrane 3-3. Observation in accordance with the methods in (1) and (2) above revealed that the microporous membrane exhibited not a microfibril structure but a vein-like nonuniform porous structure.

Reference Example 4-1

A mixture was obtained by mixing 20 parts by weight of ultrahigh molecular weight polyethylene (viscosity average molecular weight 2,000,000), 20 parts by weight of high-density polyethylene (viscosity average molecular weight 280,000), 42 parts by weight of dioctyl phthalate (DOP), and 18 parts by weight of silica flour as an inorganic filler, followed by granulation of the mixture. The mixture was charged into a biaxial extruder fitted with a T-die, and was melt kneaded at 200° C. The obtained polymer gel was extruded into a sheet shape 100 μm thick. The DOP in the molded product was completely removed therefrom through extraction with methyl ethyl ketone, after which the silica flour was extracted and removed through immersion in a caustic soda aqueous solution (20%, 60° C.) for 10 minutes, to yield a imcroporous membrane. Two of these microporous membranes were stacked onto each other, were heated at 120° C., and were stretched 5-fold in the longitudinal direction, and then 2-fold in the transversal direction. The inorganic filler content in the obtained membrane was less than 0.05 wt %. The obtained membrane had a thickness of 25 μm, a porosity of 48%, an air permeability of 90 seconds and a piercing strength of 4.1 N. This membrane was microporous membrane 4-1. Observation in accordance with the methods in (1) and (2) above revealed that the surface structure of the membrane was a microfibril structure.

Reference Example 4-2

A microporous membrane was prepared as in Reference example 4-1, except that the extraction conditions of the silica flour included dipping for 3 minutes in a caustic soda aqueous solution (20%, 60° C.). The inorganic filler content in the obtained membrane was 1.2 wt %. This membrane was microporous membrane 4-2. Observation in accordance with the methods in (1) and (2) above revealed that the surface structure of the membrane was a microfibril structure.

Reference Example 5-1

A mixture was obtained by mixing 21 parts by weight of ultrahigh molecular weight polyethylene, having a viscosity average molecular weight 2,000,000; 20 parts by weight of high-density polyethylene, having a viscosity average molecular weight 280,000; 42 parts by weight of dioctyl phthalate (DOP); and 18 parts by weight of silica flour as an inorganic filler, followed by granulation of the mixture. The mixture was charged into a biaxial extruder fitted with a T-die, and was melt kneaded at 200° C. The obtained polymer gel was extruded into a sheet shape 100 μm thick. The DOP in the molded product was completely removed through extraction with methyl ethyl ketone, after which the silica flour was extracted and removed through immersion in a caustic soda aqueous solution (20%, 60° C.) for 10 minutes, to yield a microporous membrane. Two of these microporous membranes were stacked onto each other, were heated at 120° C., and were stretched 7-fold in the longitudinal direction, and then 7-fold in the transversal direction. The obtained microporous membrane was microporous membrane 5-1. The inorganic filler content in the obtained membrane was less than 0.05 wt %. The characteristics of the membrane were a thickness of 25 bur, a porosity of 48%, an air permeability of 90 seconds and a piercing strength of 4.1 N. Observation in accordance with the methods in (1) and (2) above revealed that the surface structure of the membrane was a microfibril structure.

Example 1

A solution prepared according to the method described in (20) was applied, by dip coating, onto one surface only of the microporous membrane 1-1, at a coating speed of 0.5 m/min, followed by drying at 80° C., to yield a gas separation membrane. The above various performance characteristics of the obtained membrane were measured under the above-described conditions. The constitution and characteristics of the membrane are summarized in Table 1.

Examples 2 to 5

Gas separation membranes were obtained in accordance with the same method as in Example 1, but using microporous membranes 1-2 to 1-5 instead of microporous membrane 1-1. The above various performance characteristics of the obtained membranes were measured under the above-described conditions. The constitution and characteristics of the membranes are summarized in Table 1.

Example 6

A gas separation membrane was obtained in accordance with the same method as in Example 1, but using herein a commercially available polyethersulfone ultrafiltration membrane (Accupor-30, by American Membrane Corporation, average pore size 0.03 μm) instead of microporous membrane 1-1. The above various performance characteristics of the obtained membrane were measured under the above-described conditions. The constitution and characteristics of the membrane are summarized in Table 1.

TABLE 1

| | Units | Example 1 | Example 2 | Example 3 | Example 4 | Example 5 | Example 6 |
|---|---|---|---|---|---|---|---|
| Oxygen permeation rate of gas separation membrane | GPU | 850 | 950 | 890 | 750 | 620 | 430 |
| Oxygen permeation rate of gas separation membrane (after thermal treatment) | GPU | 830 | 930 | 870 | 730 | — | — |
| Separation factor α of gas separation membrane | $O_2/N_2$ | 2.1 | 2 | 2.1 | 2.2 | 2.2 | 2.3 |
| Separation factor α of gas separation membrane (after heating treatment) | $O_2/N_2$ | 2.1 | 2 | 2.1 | 2.2 | — | — |
| Piercing strength of gas separation membrane (room temperature) | N | 9.5 | 5 | 5.5 | 4.5 | 2.5 | 1.8 |
| Piercing strength of gas separation membrane (100° C.) | N | 5.2 | 2.9 | 3.3 | 4 | 1.3 | 1.5 |
| Gas separation membrane thickness | μm | 40 | 20 | 16 | 16 | 20 | — |
| Thermal shrinkage of gas separation membrane (100° C.) MD/TD | % | 4/2 | 4/2 | 4/2 | 4/2 | — | — |
| Thermal shrinkage of gas separation membrane (120° C.) MD/TD | % | 10/5 | 10/5 | 10/5 | 10/5 | — | — |
| Average thickness of gas-separating thin film | μm | 0.3 | 0.3 | 0.3 | 0.4 | 0.5 | 0.6 |
| Separation factor α of gas-separating thin film | $O_2/N_2$ | 2.1 | 2 | 2.1 | 2.2 | 2.2 | 2.3 |
| Microporous membrane | | Membrane 1-1 | Membrane 1-2 | Membrane 1-3 | Membrane 1-4 | Membrane 1-5 | Accupor |
| Porosity of microporous membrane | % | 40 | 40 | 40 | 41 | 48 | 67 |
| Average pore diameter of microporous membrane | nm | 50 | 70 | 50 | 100 | 100 | 30 |
| Pore diameter distribution of microporous membrane | | 1.3 | 1.4 | 1.4 | 2.5 | 2.4 | 1.2 |
| Air permeability of microporous membrane | sec | 800 | 300 | 300 | 130 | 130 | 90 |
| Thickness of microporous membrane | μm | 40 | 20 | 16 | 16 | 20 | 100 |
| Piercing strength of microporous membrane (room temperature) | N | 9.5 | 5 | 5.5 | 4.5 | 2.5 | 1.8 |
| Piercing strength of microporous membrane (100° C.) | N | 5.2 | 2.9 | 3.3 | 4 | 1.3 | 1.5 |

Example 7

The above solution was applied, by dip coating, onto one surface only of the microporous membrane 2-1, at a coating speed of 0.5 m/min, followed by drying at 80° C., to yield a gas separation membrane. The above various performance characteristics of the obtained membrane were measured under the above-described conditions. The constitution and characteristics of the membrane are summarized in Table 2.

Examples 8 to 10

Gas separation membranes were obtained in accordance with the same method as in Example 5, but using microporous membranes 2-2, 2-3 and 2-4. The above various performance characteristics of the obtained membranes were measured under the above-described conditions. The constitution and characteristics of the membranes are summarized in Table 2.

Example 11

The above solution was applied, by dip coating, onto one surface only of the microporous membrane 3-1, at a coating speed of 0.5 m/min, followed by drying at 80° C., to yield a gas separation membrane. The above various performance characteristics of the obtained membrane were measured under the above-described conditions. The constitution and characteristics of the membrane are summarized in Table 2.

Example 12

A gas separation membrane was obtained in accordance with the same method as in Example 8, but using microporous membrane 3-2 instead of microporous membrane 3-1. The above various performance characteristics of the obtained membrane were measured under the above-described conditions. The constitution and characteristics of the membrane are summarized in Table 2.

Example 13

A gas separation membrane was obtained in accordance with the same method as in Example 8, but using microporous membrane 3-3 instead of microporous membrane 3-1. The above various performance characteristics of the obtained membrane were measured under the above-described conditions. The constitution and characteristics of the membrane are summarized in Table 2.

As Table 2 shows, the separation factor dropped considerably after the pressurization treatment. An observation of the surface of the gas separation membrane revealed that small holes were formed on the gas-separating polymer layer that coats the surface of the microporous membrane.

TABLE 2

|  | Units | Example 7 | Example 8 | Example 9 | Example 10 | Example 11 | Example 12 | Example 13 |
|---|---|---|---|---|---|---|---|---|
| Oxygen permeation rate of gas separation membrane | GPU | 930 | 900 | 860 | 950 | 890 | 860 | 780 |
| Oxygen permeation rate of gas separation membrane (after thermal treatment) | GPU | 920 | 895 | 860 | 400 | 890 | 860 | 1710 |
| Separation factor α of gas separation membrane | $O_2/N_2$ | 2 | 2.1 | 2.2 | 2 | 2.1 | 2.1 | 2.2 |
| Separation factor α of gas separation membrane (after heating treatment) | $O_2/N_2$ | 2 | 2.1 | 2.2 | 2 | 2.1 | 2.1 | 1 |
| Piercing strength of gas separation membrane (room temperature) | N | 5 | 4.5 | 4.2 | 5 | 3.8 | 3.5 | 3.6 |
| Piercing strength of gas separation membrane (100° C.) | N | 3.6 | 3.3 | 3 | 3.3 | 2.9 | 2.8 | 2.5 |
| Gas separation membrane thickness | μm | 20 | 20 | 20 | 20 | 20 | 20 | 20 |
| Thermal shrinkage of gas separation membrane (100° C.) MD/TD | % | 4/2 | 3/1 | 2/1 | 18/12 | — | — | — |
| Thermal shrinkage of gas separation membrane (120° C.) MD/TD | % | 18/18 | 7/4 | 5/2 | 27/22 | — | — | — |
| Thermal shrinkage of gas separation membrane (135° C.) MD/TD | % | 40</40< | 40</40< | 20/18 | 40</40< | — | — | — |
| Average thickness of gas-separating thin film | μm | 0.5 | 0.5 | 0.5 | 0.5 | 0.5 | 0.5 | 0.5 |
| Separation factor α of gas-separating thin film | $O_2/N_2$ | 2 | 2.1 | 2.2 | 2 | 2.1 | 2.1 | 2.2 |
| Microporous membrane |  | Membrane 2-1 | Membrane 2-2 | Membrane 2-3 | Membrane 2-4 | Membrane 3-1 | Membrane 3-2 | Membrane 3-3 |
| Porosity of microporous membrane | % | 43 | 40 | 38 | 45 | 42 | 40 | 46 |
| Average pore diameter of microporous membrane | nm | 80 | 70 | 70 | 40 | 40 | 30 | 100 |
| Pore diameter distribution of microporous membrane |  | 1.4 | 1.3 | 1.4 | 1.3 | 1.2 | 1.3 | 2.2 |
| Air permeability of microporous membrane | sec | 300 | 300 | 300 | 300 | 300 | 300 | 300 |
| Thickness of microporous membrane | μm | 20 | 20 | 20 | 20 | 20 | 20 | 20 |

TABLE 2-continued

| | Units | Example 7 | Example 8 | Example 9 | Example 10 | Example 11 | Example 12 | Example 13 |
|---|---|---|---|---|---|---|---|---|
| Piercing strength of microporous membrane (room temperature) | N | 5 | 4.5 | 4.2 | 5 | 3.8 | 3.5 | 3.6 |
| Piercing strength of microporous membrane (100° C.) | N | 3.6 | 3.3 | 3 | 3.3 | 2.9 | 2.8 | 2.5 |

Example 14

The above solution was applied, by dip coating, onto one surface only of the microporous membrane 4-1, at a coating speed of 0.5 m/min, followed by drying at 80° C., to yield a gas separation membrane. The constitution and characteristics of the membrane are summarized in Table 3.

Example 15

A gas separation membrane was obtained in accordance with the same method as in Example 10, but using microporous membrane 2 instead of microporous membrane 4-1. The above various performance characteristics of the obtained membrane were measured under the above-described conditions. The constitution and characteristics of the membrane are summarized in Table 3.

Comparative Example 1

A resin comprising a binary copolymer of perfluoro-2,2-dimethyl-1,3-dioxol and tetrafluoroethylene having a glass transition temperature of 253° C. was compression-molded to manufacture a membrane having a thickness of 25 mm. The thickness thereof was 25 μm, the oxygen permeation coefficient 990 barrer, and the nitrogen permeation coefficient 490 barrer. The oxygen permeation rate was 40 GPU. The results are given in Table 3.

Comparative Example 2

A solution was made by dissolving 1 part by weight of a fluorine-containing polymer having a cyclic structure (Teflon AF2400, burl DuPont) in 49 parts by weight of a solvent (Fluorinert FC-75, by 3M), and the solution was dip-coated to a dry thickness of 5 μm on one face of the microporous membrane 4-2, used as a support membrane. The constitution and characteristics of the obtained membrane are summarized in Table 3.

Example 16

A gas separation membrane was obtained in accordance with the same method as in Example 11, but using microporous membrane 3-1 instead of microporous membrane 5-1. The above various performance characteristics of the obtained membrane were measured under the above-described conditions. The constitution and characteristics of the membrane are summarized in Table 3.

TABLE 3

| | Units | Example 14 | Example 15 | Comp. example 1 | Comp. example 2 | Example 16 |
|---|---|---|---|---|---|---|
| Oxygen permeation rate of gas separation membrane | GPU | 910 | 940 | 40 | 3.6 | 910 |
| Oxygen permeation rate of gas separation membrane (after thermal treatment) | GPU | 910 | 140 | 40 | 3.6 | 910 |
| Separation factor α of gas separation membrane | $O_2/N_2$ | 2.1 | 2.1 | 2 | 2.6 | 1.5 |
| Separation factor α of gas separation membrane (after heating treatment) | $O_2/N_2$ | 2.1 | 1 | 2 | 2.6 | 1.5 |
| Piercing strength of gas separation membrane (room temperature) | N | 4.1 | 4.1 | 1 | 4.1 | 3 |
| Piercing strength of gas separation membrane (100° C.) | N | 3 | 3 | 1 | 3 | 3 |
| Gas separation membrane thickness | μm | 25 | 25 | 25 | 25 | 15 |
| Thermal shrinkage of gas separation membrane (100° C.) MD/TD | % | 1/1 | 1/1 | — | 1/1 | 1/1 |
| Average thickness of gas-separating thin film | μm | 0.5 | 0.5 | 25 | 5 | 0.5 |
| Separation factor α of gas-separating thin film | $O_2/N_2$ | 2.1 | 2.1 | 2 | 2.6 | 1.5 |
| Microporous membrane | | Membrane 4-1 | Membrane 4-2 | None | Membrane 4-2 | Membrane 5.1 |
| Porosity of microporous membrane | % | 48 | 48 | — | 48 | 55 |
| Average pore diameter of microporous membrane | nm | 300 | 300 | — | 300 | 400 |

TABLE 3-continued

| | Units | Example 14 | Example 15 | Comp. example 1 | Comp. example 2 | Example 16 |
|---|---|---|---|---|---|---|
| Pore diameter distribution of microporous membrane | | 2.3 | 2.3 | — | 2.3 | 3 |
| Air permeability of microporous membrane | sec | 90 | 90 | — | 90 | 120 |
| Thickness of microporous membrane | μm | 25 | 25 | — | 25 | 25 |
| Piercing strength of microporous membrane (room temperature) | N | 4.1 | 4.1 | — | 4.1 | 3 |
| Piercing strength of microporous membrane (100° C.) | N | 3 | 3 | — | 3 | 3 |

INDUSTRIAL APPLICABILITY

The gas separation membrane of the present invention can be used as a gas separation membrane that is employed in chemical processes, air conditioning, combustion furnaces and the like.

The invention claimed is:

1. A gas separation membrane, which comprises a porous support membrane and a gas-separating thin film that comprises a gas-separating resin as a main component,
    wherein the porous support membrane is a polymeric microporous membrane formed using a polyethylene as a main component,
    the polymeric microporous membrane comprises microfibrils having a network structure,
    the polymeric microporous membrane has an average pore diameter of 1 nm to 200 nm by gas-liquid porometry,
    the pore diameter distribution index is 1.1 to 1.5 by a pullulan method, and
    the gas separation membrane has an oxygen permeation rate not smaller than 100 GPU and an oxygen-nitrogen separation factor not smaller than 1.1.

2. The gas separation membrane according to claim 1, wherein the porous support membrane is a polymeric microporous membrane having a porosity of 20% to 80%, the gas separation membrane comprises the gas-separating thin film having an average thickness of 0.01 μm to 5 μm at least on one surface, and/or the interior of the polymeric microporous membrane, the oxygen-nitrogen separation factor of the gas-separating resin being not smaller than 1.5.

3. The gas separation membrane according to claim 1, wherein the porous support membrane is a polymeric microporous membrane having a porosity of 20% to 80%, the gas-separating resin forms a thin film in an amount from 0.01 g/m² to 10 g/m² at least on one surface, and/or the interior of the polymeric microporous membrane, and the oxygen-nitrogen separation factor of the resin is not smaller than 1.5.

4. The gas separation membrane according to claim 1, wherein the polymeric microporous membrane is a polyolefin microporous membrane manufactured by wet separation process.

5. The gas separation membrane according to claim 1, wherein the polymeric microporous membrane contains one or two types selected from among ultrahigh molecular weight polyethylene having a viscosity average molecular weight of 300,000 to 4,000,000 and polypropylene having a viscosity average molecular weight of 100,000 to 3,000,000.

6. The gas separation membrane according to claim 2, wherein the polymeric microporous membrane has a thickness of 5 μm to 200 μm.

7. The gas separation membrane according to claim 2, wherein the air permeability of the polymeric microporous membrane is 50 to 1500 seconds.

8. The gas separation membrane according to claim 2, wherein the piercing strength at 100° C. of the polymeric microporous membrane is 1 to 50 N.

9. The gas separation membrane according to claim 2, wherein the thermal shrinkage of the polymeric microporous membrane at 100° C. is not greater than 5% both in the longitudinal and transversal directions.

10. The gas separation membrane according to claim 1, wherein the gas-separating resin is a fluorine-containing gas-separating thin film comprising a fluororesin.

11. The gas separation membrane according to claim 1, wherein the gas-separating resin is a fluororesin having an oxygen-nitrogen separation factor not smaller than 1.5.

12. The gas separation membrane according to claim 1, wherein the gas-separating resin is a copolymer of perfluoro-2,2-dimethyl-1,3-dioxol and tetrafluoroethylene.

13. The gas separation membrane according to claim 1, wherein the thickness of the gas-separating thin film ranges from 0.01 μm to less than 1 μm.

14. The gas separation membrane according to claim 1, wherein the gas-separating resin forms a thin film in an amount of 0.01 g/m² to 10 g/m².

15. The gas separation membrane according to claim 1, wherein the thermal shrinkage at 100° C. of the gas separation membrane ranges from 0 to 5% both in the longitudinal and transversal directions.

16. The gas separation membrane according to claim 1, wherein the piercing strength of the gas separation membrane at 100° C. is 1 to 50 N.

17. The gas separation membrane according to claim 1, wherein the oxygen-nitrogen separation factor of the gas separation membrane is not smaller than 1.5.

18. A nitrogen enriching system comprising the gas separation membrane according to claim 1.

19. An oxygen enriching membrane comprising the gas separation membrane according to claim 1.

20. The gas separation membrane according to claim 1, wherein the porous support membrane comprises inorganic fillers.

21. The gas separation membrane according to claim 20, wherein the content of the inorganic fillers ranges from 5 to 80 wt % relative to the total weight of the microporous membrane.

22. The gas separation membrane according to claim 2, wherein the thickness of the microfibrils ranges from 20 nm to 200 nm over 80% or more of the entire fibril.

* * * * *